Jan. 7, 1941.  C. P. SWEENY  2,227,467
ELECTRIC MOTOR
Original Filed April 3, 1936  7 Sheets-Sheet 1

Inventor
Charles P. Sweeny
By Barnes, Kisselle, Laughlin & Raisch
Attorneys

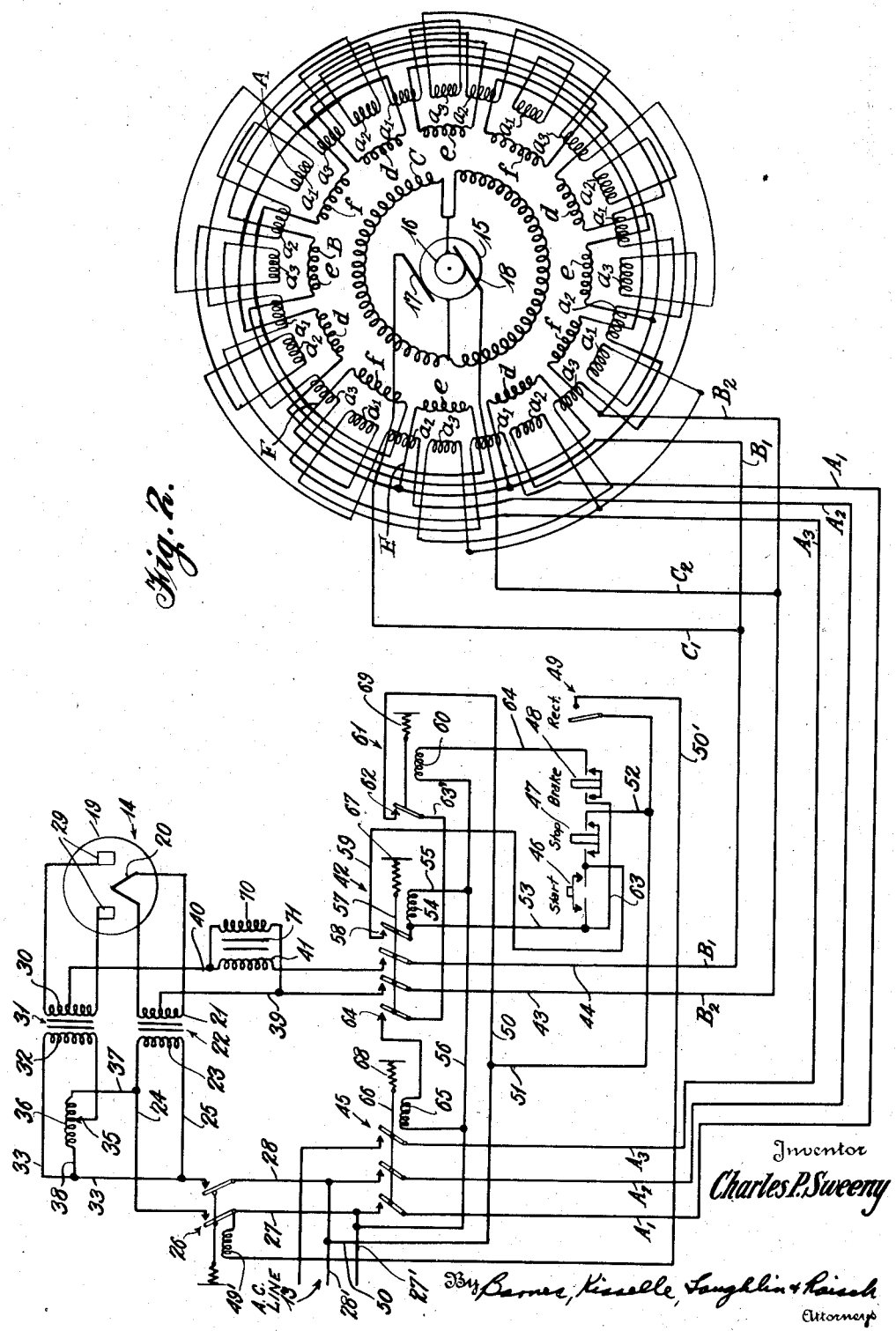

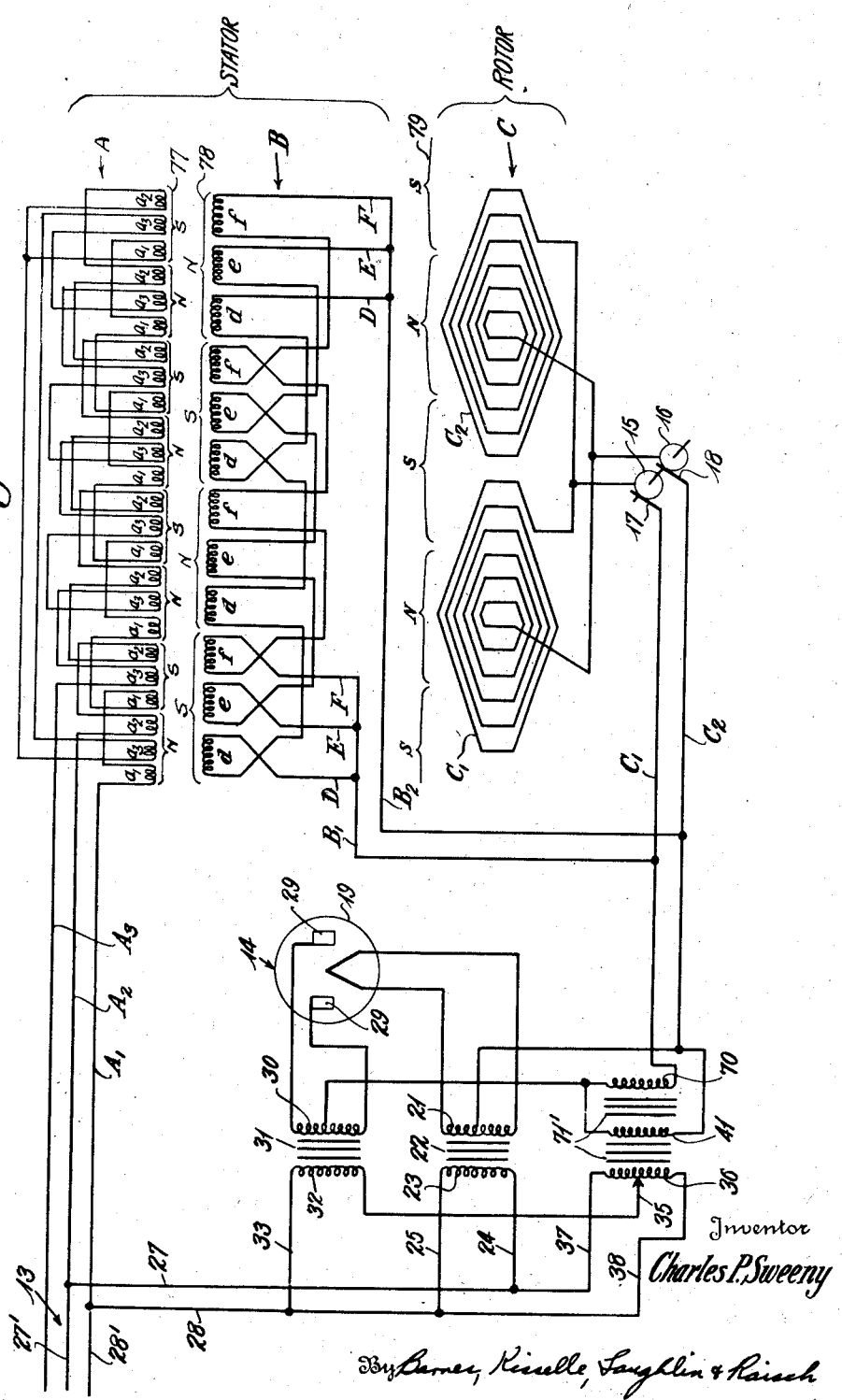

Inventor
Charles P. Sweeny

Jan. 7, 1941.   C. P. SWEENY   2,227,467
ELECTRIC MOTOR
Original Filed April 3, 1936   7 Sheets-Sheet 5
Fig. 13.
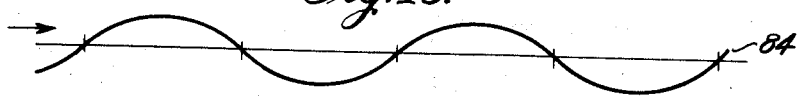
Fig. 14.
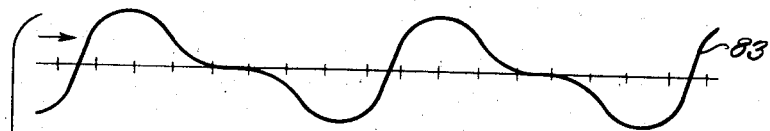
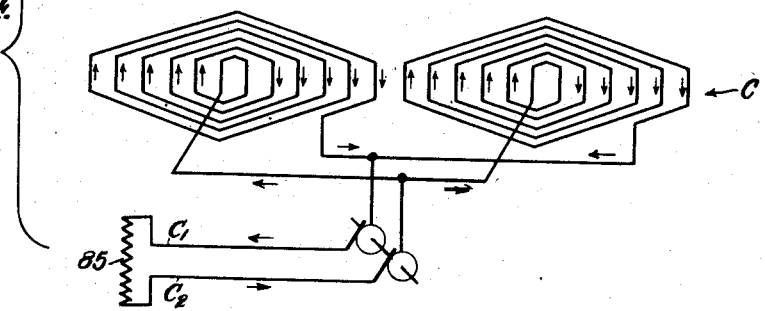
Fig. 15.
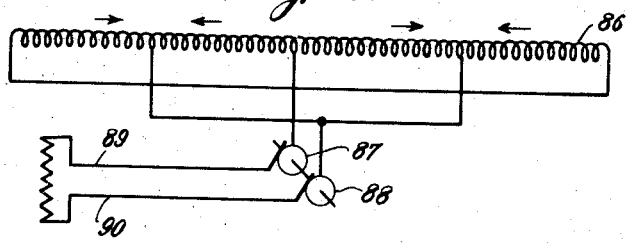
Fig. 16.
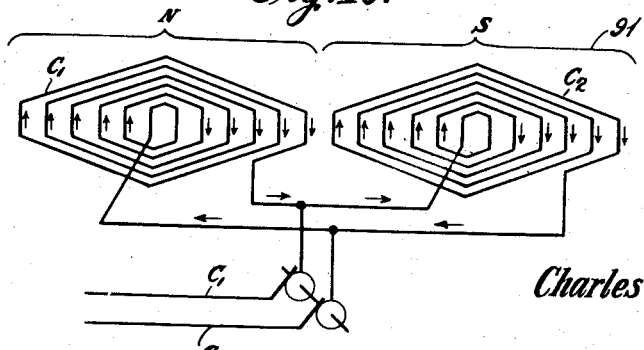
Inventor
Charles P. Sweeny
By Barnes, Kisselle, Laughlin & Raisch
Attorneys

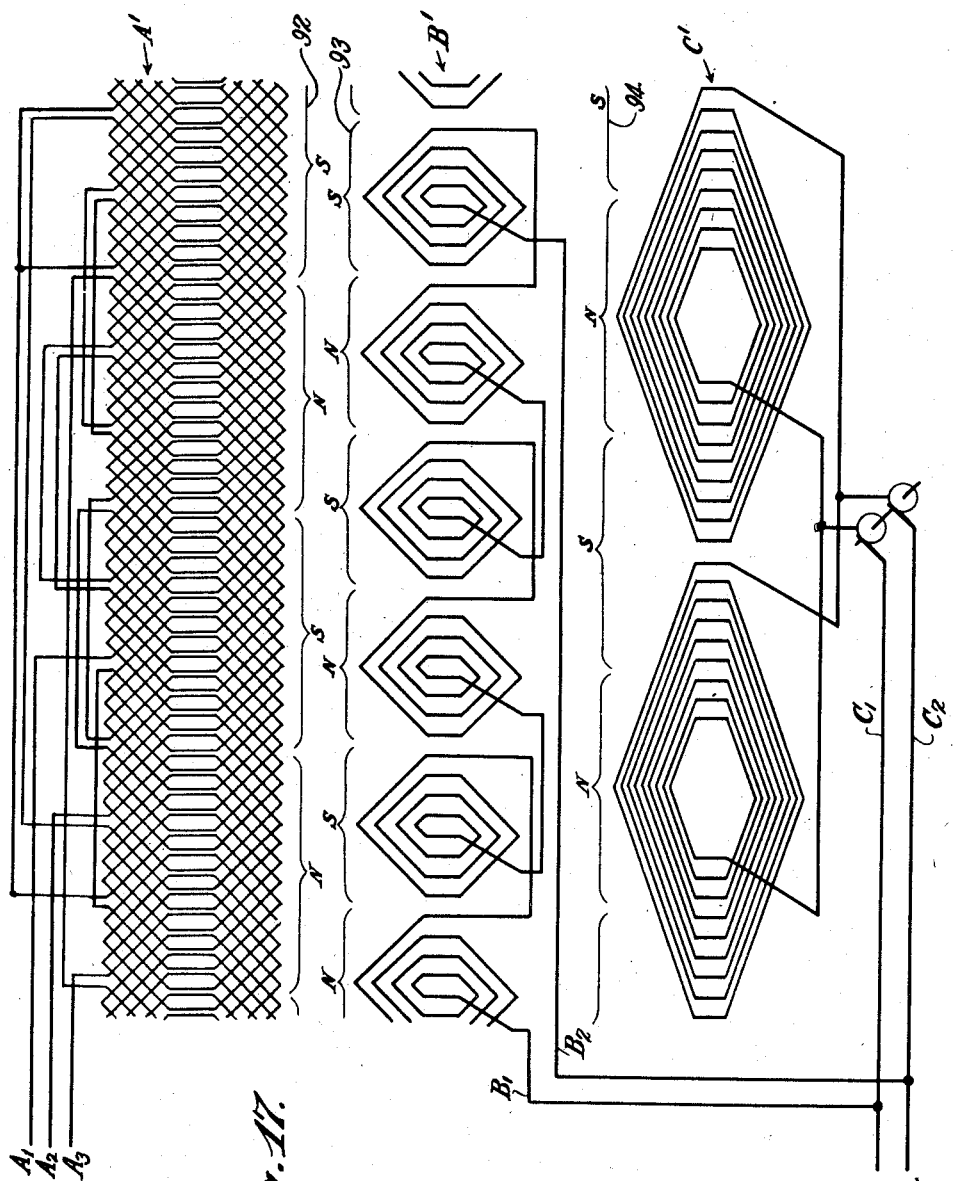

Jan. 7, 1941.  C. P. SWEENY  2,227,467
ELECTRIC MOTOR
Original Filed April 3, 1936   7 Sheets-Sheet 7
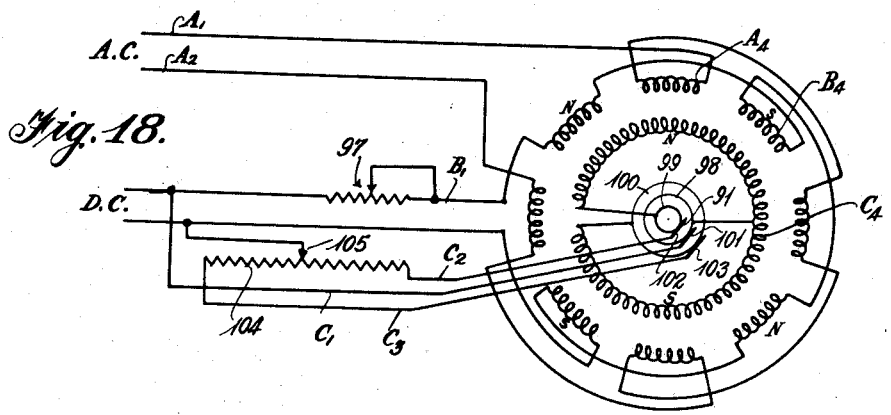
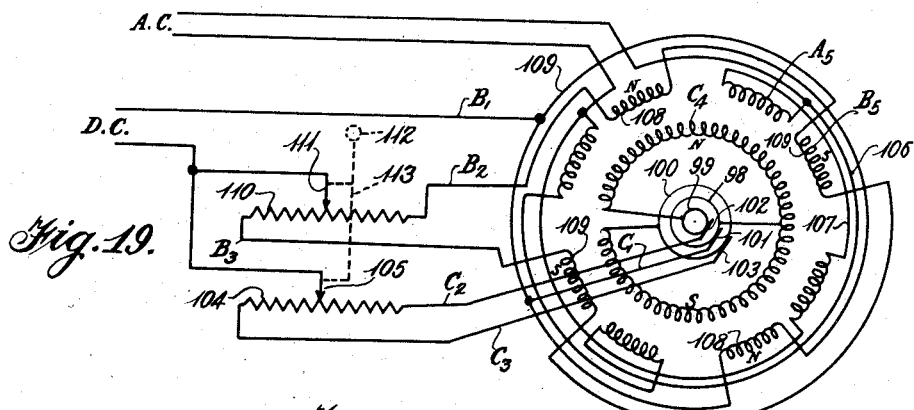
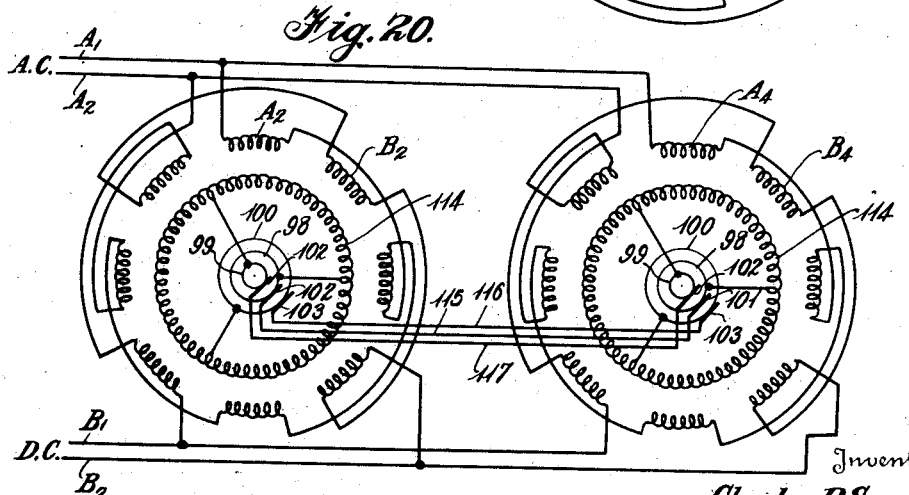
Inventor
Charles P. Sweeny Patented Jan. 7, 1941

2,227,467

UNITED STATES PATENT OFFICE 2,227,467

ELECTRIC MOTOR

Charles P. Sweeny, Washington, D. C., assignor to Vickers, Incorporated, Detroit, Mich., a corporation of Michigan Application April 3, 1936, Serial No. 72,632
Renewed March 2, 1940

23 Claims. (Cl. 172—120)

This invention relates to electric motors and more particularly to motors having both alternating current and direct current windings.

It is an object of the present invention to provide an electric motor of the non-synchronous type in which the power torque is produced by an alternating current field and in which this torque is controlled by a direct current field.

Another object of the invention is to provide an alternating current motor having a stator winding and a rotor winding and a third winding adapted to be energized by direct current to control the effect of one of these windings upon the other to determine the effective torque of the motor.

Another object of the invention is to provide an alternating current motor having speed-torque characteristics approaching that of a D. C. shunt motor such that the speed of the motor may be varied within wide limits, but the speed for a particular setting of the control circuit will remain approximately constant under widely varying loads.

Another object of the invention is to provide a variable speed alternating current motor having a direct current winding adapted to be connected to a source of direct current power for controlling the speed of the motor.

Another object of the invention is to provide a direct current control circuit for an alternating current induction motor to enable the speed of said motor to be varied within wide limits.

Another object of the invention is to provide an electric motor in which direct current windings upon the stator element and rotor element control the operation of an alternating current winding positioned upon one of these elements to produce a variable speed alternating current motor.

Another object of my invention is to provide means for controlling the reactance of the various windings of an alternating current electric motor.

Another object is to control the action of an alternating current field in a variable speed alternating current motor by a direct current field.

Another object of the invention is to provide a direct current field to control the speed and torque of a variable speed alternating current induction motor.

A further object of the invention is to provide a novel method of controlling the speed and torque of an alternating current electric motor.

A still further object of the invention is to provide a motor, having alternating current and direct current windings, which will act as a brake when the alternating current windings are disconnected from their source of power and the direct current windings are left connected to their source of power.

Other objects and advantages of the invention will appear in the following specification of the preferred embodiments of my invention which are shown on the attached drawings, of which:

Figure 2 is a schematic drawing showing the winding connections and control circuit of a motor in accordance with this invention;

Figure 3 is a diagrammatic drawing of the motor of Fig. 2 with the windings developed and showing a modification of the control circuit;

Figure 13 is a curve showing the flux produced by the induced currents of Fig. 12;

Figure 14 is a schematic drawing showing the voltages induced in the rotor windings by the flux of Fig. 11;

Figure 15 is a schematic drawing showing a modification of the rotor windings;

Figure 16 is a schematic drawing showing a further modification of the rotor windings;

Figure 17 is a diagram showing the developed windings of a modified form of a motor;

Figure 18 is a schematic drawing of a motor in accordance with this invention connected as a torque relay;

Figure 19 is a similar drawing showing a modification of the device of Fig. 18; and Figure 20 is a similar drawing showing motors similar to that of Fig. 20 connected as an electric gear.

As one example of a motor embodying the invention, a polyphase motor having an eight-pole A. C. winding on the stator, a four-pole D. C. winding on the stator and a four-pole D. C. winding on the rotor is illustrated in Figs. 1 to 12. Referring to these figures, and particularly Fig. 1, A indicates a distributed alternating current winding positioned in slots in the stator 10 of the motor; B indicates a direct current winding also positioned in slots in the stator 10; and C indicates a direct current winding positioned in slots in the rotor 11 carried by the shaft 12. The windings B and C control the action of the field produced by the winding A to vary the speed and torque of the motor and provide a braking action.

Figure 1:
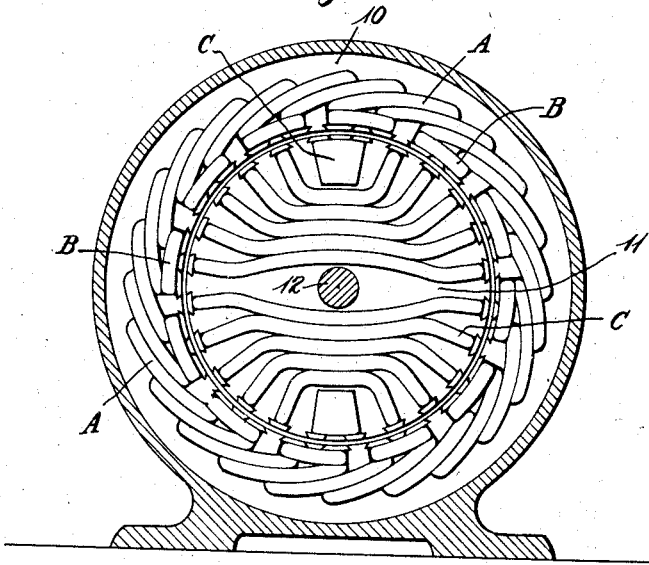
Figure 1 is a diagrammatic end view partly in section of an alternating current motor in accordance with this invention.

In the modification shown in Figs. 2 and 3, the alternating current winding A is connected to an alternating current line 13 by the conductors $A_1$, $A_2$ and $A_3$, and includes a series of coils $a_1$, $a_2$ and $a_3$ arranged to form an eight-pole, three-phase alternating current winding. Direct current winding B upon the stator includes a series of coils $d$, $e$ and $f$ included in the circuits D, E and F, respectively, and connected to a source of D. C. power, 14, by the conductors $B_1$, $B_2$. As shown in Fig. 3, the coils of this winding are connected to form a four-pole D. C. winding. The rotor winding C, as shown in Figs. 1 and 3, comprises preferably a series of coils of varying diameter concentrically disposed to form two complete coils $c_1$, $c_2$, connected through the slip rings 15 and 16, collectors 17 and 18, and conductors $C_1$, $C_2$ to the conductors $B_1$ and $B_2$ and thereby to the direct current source of power 14 so as to be in parallel with the direct current windings B of the stator. The C winding is shown in Fig. 3 as a four-pole winding having two main poles and two consequent poles.

The D. C. source of power shown in Fig. 2 comprises a rectifying tube 19 having its filament 20 connected to secondary 21 of a filament transformer 22, the primary 23 of which is connected by conductors 24 and 25, magnetic switch 26, and conductors 27 and 28, to wires 27' and 28' forming one-phase of a three-phase line 13. The plates 29 are energized from the secondary 30 of a plate transformer 31. One terminal of the primary 32 of the transformer 31 is connected through conductor 33 to conductor 25 and through switch 26 and conductor 28 to one wire 28' of the line 13. The other terminal of the primary 32 is connected to the slider 35 of an adjustable auto-transformer 36, the end terminals of which are connected across wires 27' and 28' of the alternating current line 13 by conductors 37, 38, conductors 24 and 33, 25, switch 26, and conductors 27 and 28. Adjusting the slider 35 of the auto-transformer 36 enables the voltage impressed upon the plates 29 of the tube 19 through the transformer 31 to be varied.

Rectified current is obtained from the center taps of the secondaries 21 and 30 of the transformers 22 and 31, respectively (Fig. 2), by conductors 39 and 40 which are connected to the B and C windings of the motor through a reactor coil 41, magnetic switch 42, conductors 43 and 44, and conductors $B_2$, $B_1$, $C_2$ and $C_1$, respectively. The A winding of the motor is connected by conductors $A_1$, $A_2$, $A_3$, and switch 45 to the A. C. line 13.

Closing the manually operable rectifier switch 49 energizes the coil 49' of the rectifier switch 26 by closing a circuit, which can be traced from one wire 28' of the A. C. line 13 through conductor 50, conductor 51, manually operable switch 49, conductor 50', coil 49', and conductor 27 to wire 27' of the A. C. line.

The switches 42 and 45 are controlled by the stop-start and brake buttons 46, 47 and 48, respectively. When the start button is depressed, a circuit is completed from wire 28' of the A. C. line 13 through conductor 50, conductor 51, conductor 52, the stop button 47 which normally maintains its contacts closed, the starter button 46, conductor 53, through the operating coil 54 of the switch 42, conductor 55, and conductor 56 to wire 27' of the A. C. line 13. The coil 54 moves the armature 57 of the switch 42 to the left in Figure 2 to complete the D. C. circuit from the D. C. source 14 to the conductors $B_1$, $B_2$, $C_1$ and $C_2$. Depressing start button 46 also completes a circuit through operating coil 60 of brake relay 61 to close contacts 62 thereof for a purpose to be described. This circuit may be traced from wire 28' of the A. C. line 13, through conductor 50, conductor 51, conductor 52, normally closed stop button 47, start button 46, conductor 63, brake button 48, conductor 64, coil 60, and conductor 56 to wire 29' of the A. C. line 13. Movement of the armature also completes a holding circuit through contacts 58 connected in parallel with the starting button 46 by conductors 53 and 59 to maintain operating coils 54 and 60 of switch 42 and relay 61 energized. Movement of the armature 57 of switch 42 also closes contacts 64 to complete a circuit through operating coil 65 of alternating current switch 45. This circuit may be traced from wire 28' of the A. C. line through conductor 50, contact 62 of relay 61, conductor 63', contacts 64, coil 65 and conductor 56 to wire 27' of the A. C. line. Energization of coil 65 moves the armature 66 of alternating current switch 45 to the left in Fig. 2 to close the contacts of the switch and connect the alternating current line 13 to the conductors $A_1$, $A_2$ and $A_3$.

In starting the motor, the manually operable rectifier switch 49 is first closed to close the magnetic switch 26 which energizes the auto-transformer 36 and the filament and plate transformers 22 and 31, respectively, of the rectifying tube 19. The slider or contact arm 35 of the auto-transformer 36 is positioned for the speed desired or moved toward the left in Fig. 2 to start the motor in low speed, if starting under load. As soon as the filament of the rectifier tube becomes heated, starting button 46 may be depressed to close switches 42 and 45 to connect the motor to the A. C. and D. C. sources of power. It is noted that the D. C. switch is closed first so that the D. C. control circuit is connected to the motor before the A. C. source of power is applied thereto.

If, when the motor is operating, the stop button is depressed, the holding circuit through contacts 58 of switch 42 is broken to de-energize coil 54 and switch 42 is opened, as by a spring 67 to disconnect the D. C. source of power from the motor. Contacts 64 of switch 42 are also opened to open the circuit through operating coil 65 of switch 45 to cause this switch to be opened by a spring 68. This disconnects the motor from both sources of power allowing it to coast to a stop. Since the stop button is included in the circuit of operating coil 60 of the brake relay 61, this coil is also de-energized and contacts 62 opened by spring 69.

If, while the motor is running, the brake button 48 is depressed, the normally closed circuit through operating coil 60 of relay 61 is broken to allow the contacts 62 to be opened by the spring 69. When contacts 62 of relay 61 are opened, the circuit through operating coil 65 of the A. C. switch 45 is de-energized. This allows the A. C. switch 45 to disconnect the alternating current from the motor, leaving the direct current connected to both the stator winding B and the rotor winding C. Under these conditions a powerful braking force is set up in order to stop the same, as will be hereinafter explained.

The reactor coil 41 of Figure 2 serves to smooth out pulsations in the D. C. current from the rectifier tube 19 and a high resistance coil 70 connected across the conductors 39 and 40 from the D. C. source of power is placed upon the same core 71 as the coil 41 to determine the saturation thereof in order to control the reactance of coil 41.

The power circuits are more easily traced in Fig. 3 from which all control switches have been omitted. In this figure, the auto-transformer coil 36 has been positioned upon the same core 71' as the reactor coils 41 and 70. This modification provides for somewhat better speed regulation of the motor, particularly at low speeds, as will hereafter be explained, although for most purposes this construction will not be necessary.

Figure 4:
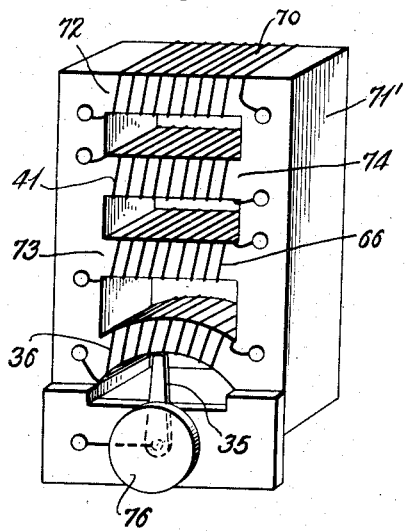
Figure 4 is a diagrammatic drawing of a combined control reactor and auto-transformer.
Figure 5:
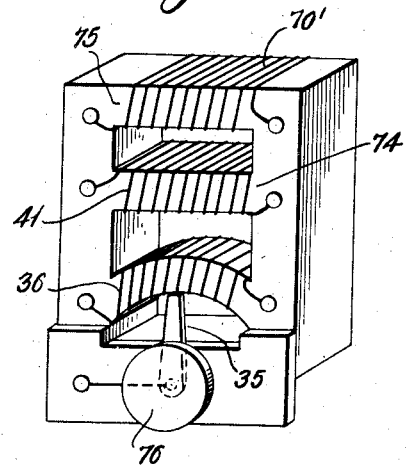
Figure 5 is a diagrammatic drawing of a modification of the device of Fig. 4.

The structure of the combined auto-transformer and reactor coils is more clearly shown in Fig. 4. In this figure, the auto-transformer coil 36 is placed upon a curved leg of the iron core 71' so as to be contacted by the slider or contact arm 35. Reactor coil 70 is divided into two portions and placed upon the upper leg 72 and intermediate leg 73, while the coil 41 is placed upon the intermediate leg 74. A simpler modification of the device is shown in Fig. 5, wherein the series reactor coil 70', corresponding to coil 70 of Figs. 3 and 4, is in one portion and placed upon the upper leg 75. In both modifications the contact arm 35 of the auto-transformer may be moved from one end of the auto-transformer winding 36 to the other by a knob 76.

Referring to Fig. 3, an instantaneous polarity around the stator, due to the alternating current winding A, in the particular motor disclosed therein, is shown by the brackets 77. The north and south poles indicated thereby can be considered as moving toward the right in this figure at synchronous speed. The stationary direct current polarity is indicated by the brackets 78. The direct current poles of the rotor in one position thereof are indicated by the brackets 79. It will be noted that in this motor there is no tendency for a magnetic locking between the poles of the winding A and the winding C when these windings are energized by A. C. and D. C. respectively and winding B is not energized. Winding A is an eight-pole winding and winding C is a four pole winding and even if the rotor were moving at synchronous speed, a north pole of the winding C would be opposite a south pole of the winding A only when a south pole of the winding C is opposite a south pole of the winding A. There is thus no resultant attraction or repulsion between the poles of the winding A and the poles of the winding C if the rotor were to move at synchronous speed and such magnetic locking is not necessary for motors operating in accordance with this invention. It is pointed out, however, that A and C windings having the same number of poles may be employed as will hereinafter be explained. In the motor shown, the B and C windings do lock magnetically since both are four-pole windings, but B and C windings having different numbers of poles so as to have no tendency to lock may be employed, as will also be hereafter explained.

Figure 6:
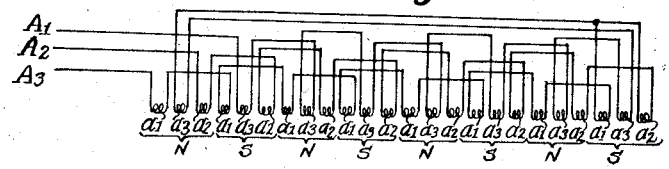
Figure 6 is a schematic drawing of the developed alternating current windings of Figs. 2 and 3 showing an instantaneous position of the magnetic poles produced.
Figure 7:
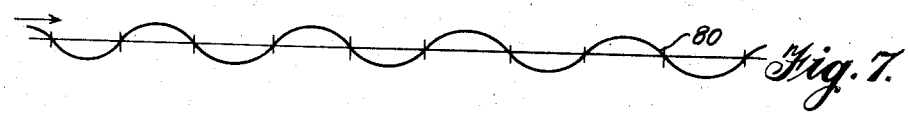
Figure 7 is a curve showing an instantaneous position of the flux cutting the alternating current windings of Fig. 4.
Figure 8:
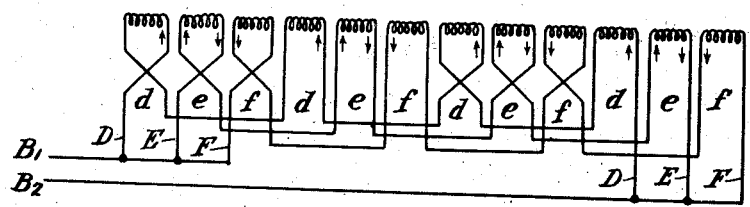
Figure 8 is a schematic drawing of the developed D. C. stator windings of Figs. 2 and 3 showing the voltages induced by the flux of Fig. 7.

Referring to Figs. 6 and 7, the curve 80 may be considered to represent the flux in the stator iron due to energization of the winding A shown immediately above in Fig. 4, when this winding only is energized. The flux is necessary to set up a voltage in the winding A opposing the voltage applied thereto and rotates at the synchronous speed of the stator winding, or may be considered for purposes of discussion as moving to the right in Fig. 5, as shown by the arrow. This flux cuts the conductors of the winding B shown in Fig. 8, but no resultant voltage is induced therein, since, as shown by the small arrows adjacent the coils $d$, $e$, $f$, the voltages in the conductors of the coil sides of each circuit D, E, F oppose each other. That is, no resulting voltage, except that due to slight variations in the positions of the conductors in the stator slots, appears across the terminals of the circuit D, and the same is true of circuits E and F. Thus the winding B has no substantial effect on winding A when no D. C. is being applied to the motor, that is to say, when winding A only is energized.

This arrangement is, in general, necessary since otherwise, winding B would function in a manner similar to a short circuited transformer winding and extremely large currents would flow in winding A. A simple manner of providing this arrangement is to make winding B of a different number of poles than winding A. However, it will be apparent that it is possible to make windings A and B of the same number of poles and still obtain this condition by properly positioning the conductors of the B winding.

Figure 9:
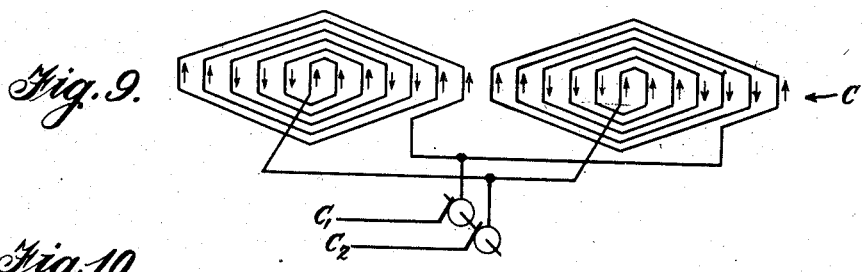
Figure 9 is a similar drawing of the rotor windings of Figs. 2 and 3 showing the voltages induced by the flux of Fig. 7.

Also, in the motor under discussion, no resultant voltages are induced in winding C by the flux of Fig. 7 since, as shown by the arrows in Fig. 9, the voltages induced in the conductors of this winding balance each other, and no resultant voltage appears across the conductors $C_1$ and $C_2$. Because of structural inaccuracies and the varying positions of the conductors in the rotor slots, a small voltage may appear across the conductors $C_1$ and $C_2$, and the rotor may tend to rotate due to eddy currents in the iron and conductors. However, no power torque is developed, and the motor will not run under load with winding A only energized.

However, when winding B is energized by direct current, there is a resultant flux set up which does induce resultant voltages in windings B and C. When winding B is energized with direct current, a stationary flux similar to that shown by the curve 81 of Fig. 10 tends to be set up in the air gap and has the polar arrangement as shown, for example, by the brackets 82 of Fig. 12. The curves of Figs. 7 and 10 may be considered to be curves of magnetomotive force which add to give a resultant curve similar to that of curve 83 of Fig. 11. However, flux as shown by the curve 80 of Fig. 7 must continue to cut the conductors of winding A in order to oppose the voltage applied thereto, and more current will flow in winding A until such a flux does cut these conductors. A varying flux of this wave form is, therefore, present in the iron adjacent winding A but is more or less confined thereto by the energization of winding B. This increases the saturation of the iron adjacent winding A and causes more current flow in winding A when winding B is energized with direct current. That is, the impedance of winding A is decreased as winding B is energized.

Figure 11:
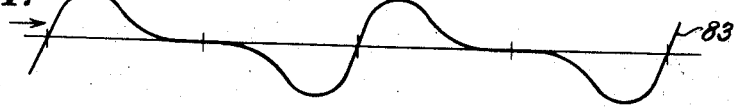
Figure 11 is a curve showing the resultant of the curves of Figs. 7 and 10.
Figure 12:
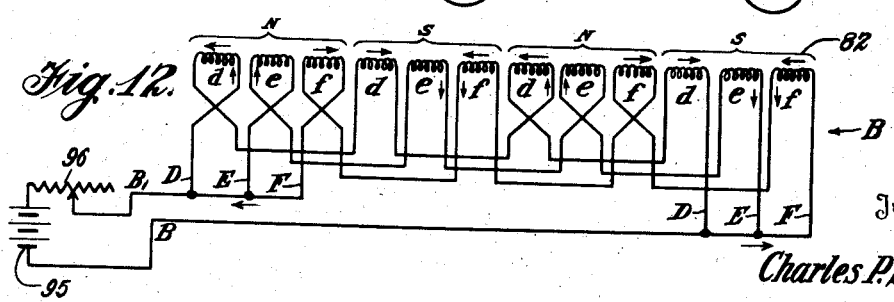
Figure 12 is a view similar to Fig. 8 showing the voltages and currents resulting from the flux of Fig. 11 cutting the D. C. windings of the stator.

The curve 83 of Fig. 11, may also be taken as representing the flux set up in the iron adjacent winding B and in the air gap due to energization of windings A and B. As will be noted from a consideration of the curves 80 and 83, the peaks of the flux curve 83 will move to the right, as shown by the arrow in Fig. 11, since the peaks of the flux curve 80 of Fig. 7 move to the right. These peaks will move at substantially the synchronous speed of the winding A of Fig. 6 and, because of their position in space relative to the winding B, will cut the conductors of the coils of this winding and induce resultant voltages across the terminals of the circuits D, E, F. The voltages induced in the coil sides at one instant are indicated roughly by the vertical arrows of Fig. 12 and will cause instantaneous currents to flow in winding B, as indicated roughly by the horizontal arrows of Fig. 12. The winding B becomes a closed three-phase winding for this current, and no substantial resultant alternating current flows in the conductors $B_1$ and $B_2$ as the voltages induced by the flux 83 of Fig. 11 produce no resulting voltage across the conductors $B_1$ and $B_2$ except such voltages as may result from inaccuracy in the position of the conductors in the stator slots.

Winding B thus becomes a power winding with alternating currents induced therein, and a magnetomotive force tending to produce a flux, indicated roughly by the curve 84 of Fig. 13, is produced in the stator iron and in the air gap, and this flux moves to the right in Fig. 13, as shown by the arrow, at the synchronous speed of this winding. This flux further saturates the stator iron and confines the flux of Fig. 7 to the iron adjacent the winding A to still further lower the impedance of this winding and cause more current to flow therein.

Figure 10:
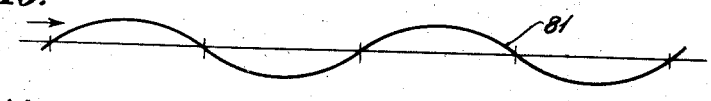
Figure 10 is a curve showing the flux produced by the windings of Fig. 8 when energized with direct current.

The resultant air gap flux, of course, is that produced by the resultant of the magnetomotive forces of windings A and B, but, for purposes of discussion, it is convenient to consider the fluxes of Figs. 10, 11 and 13 separately. The moving fluxes indicated by the curves of Figs. 11 and 13 will cut the rotor windings to produce resultant voltages therein and the stationary flux of Fig. 10 will do likewise if the rotor is moving. One instantaneous position of the rotor relative to the flux 83 of Fig. 11 is shown in Fig. 14, wherein the voltages induced by the flux peaks moving toward the right in this figure are indicated roughly by the vertical arrows of Fig. 14. These voltages act to produce a resultant voltage across the conductors $C_1$ and $C_2$ so that a current would flow through the coils, as indicated by the horizontal arrows of Fig. 14, $c_1$ and $c_2$ if the circuit were closed, for example, by connecting conductors $C_1$ and $C_2$ across a resistance 85.

Since the peaks of the flux curve 84 of Fig. 13 occupy substantially the same relative position in space as the flux peaks of the flux curve 83 of Figs. 11 and 14, voltages will also be induced in the conductors of the coils $c_1$ and $c_2$ of winding C to cause a current to flow through the resistance 85. The rotor 11 of Figure 1 takes power current, and the motor will function as an induction motor if the rotor is connected as shown in Fig. 14 and winding A energized by alternating current and winding B by direct current. The rotor current sets up a flux which still further saturates the stator iron, causing more power current to be taken by winding A.

For weak energization of the winding B, the fluxes of Fig. 11 tend to predominate, and as the flux peaks of this flux move at substantially the synchronous speed of the winding A, the motor runs at a relatively high speed. As winding B is more strongly energized, the stationary flux of Fig. 10 becomes greater and the motor runs at a lower speed. At low speed this stationary flux predominates. The frequencies of the currents induced in winding C are the slip frequencies between the rotor and the fluxes of Figs. 10, 11 and 13. At low speeds a low frequency current caused by the voltage resulting from the rotor conductors cutting the stationary flux 81 of Fig. 10 predominates and this frequency becomes lower, the lower the speed of the rotor.

As pointed out above, with reference to Fig. 9, no resultant voltages are induced in the winding C of the particular motor shown in Figs. 2 and 3, by the flux (Fig. 7) due to the A winding when this winding is the only one energized. However, in this motor, energizing winding A with A. C. and winding C with D. C. without energizing winding B will cause resultant voltages to be produced in the rotor windings C for the same reason that energization of winding B caused resultant voltages in winding C. The flux produced by winding C is of substantially the same form as that produced by winding B and the resultant flux of windings A and C will be similar in form to that of Fig. 11. Thus, winding B can be eliminated and a variable speed motor obtained. The employment of both windings B and C is, however, preferred as better speed and torque control is effected.

Instead of the type of rotor winding disclosed in Figs. 3, 9 and 14, indicated by the reference character C, a conventional wound rotor winding, indicated at 86 in Fig. 15, may be employed on the rotor of the motor, and resultant voltages will be induced across the conductors 89 and 90 connected to the slip rings 87 and 88 to cause currents to flow therein and the motor to operate as an induction motor. In the winding shown no voltages will be induced in the rotor when the winding A only is energized, and speed control can be effected by varying the energization of winding B. Also D. C. energization of the modified winding 86 may be employed to produce an effect similar to D. C. energization of winding C. However, the winding C is preferred since this type of winding has been found to effect smoother operation and a more rigid speed control.

Energizing the rotor winding with direct current still further saturates the iron of the stator to reduce the impedance of winding A and cause it to take more power current and produce more torque. Furthermore, energization of this winding in the motor under discussion produces a braking or dragging effect due to magnetic attraction of the poles produced by windings B and C both of which are four-pole windings. Also, as pointed out hereinabove, when the rotor is rotating, the flux produced by the direct current energization of the B' winding cuts the conductors of the rotor winding C to induce voltages therein and cause currents to flow which tend to reduce the speed of rotation. Energization of the rotor winding C with direct current intensifies this effect in substantially the same manner that energization of the B winding causes voltages to be induced therein from the A winding. By removing the A. C. energization of the A winding, the motor is brought quickly and smoothly to a stop.

The air gap flux, when the motor is running, is the resultant of that produced by the rotating field of the three-phase winding A; the stationary direct current field of the winding B; the field produced by the currents induced in winding B from winding A when winding B is energized; the direct current field of winding C, which rotates with the rotor; and the field produced by the currents induced in winding C by the various stator fluxes. In addition, as shown in Fig. 3, the single phase alternating current appearing at the terminals of winding C and flowing through the conductors $C_1$ and $C_2$ is superimposed upon the direct current energization of winding B. Thus windings B and C may be considered as being connected in series for the single phase alternating voltages produced in winding C, and the resulting current flowing through winding B also modifies the resultant flux in the air gap. These effects all add to produce a substantially uniform saturation of the iron.

Another possible rotor connection is illustrated in Fig. 16, in which the coils $c_1$ and $c_2$ are connected so as to produce a two-pole D. C. field as indicated by the brackets 91. It will be noted that the voltages induced in the coils by the various fluxes primarily result in circulating currents in the rotor windings. Energization of this winding by connecting the conductors $C_1$ and $C_2$ to a direct current source will produce a D. C. field modifying the air gap flux in substantially the same manner as the winding C of Figs. 3, 9 and 14. There is, however, no tendency for magnetic interlocking of the D. C. poles of the B and C rotor windings but a braking effect will be produced when the rotor is moving due to the rotor conductors cutting the stationary flux of the B winding. Circulating currents will flow in the rotor winding and if the A. C. energization of the A winding is removed, leaving the B and C windings energized, the rotor is braked at a rate depending upon the D. C. energization. It will be apparent that the distributed winding 86 of Fig. 15 can be connected to primarily produce circulating currents and that windings similar to those of Figs. 14 and 16 can be provided, with two, four, or any number of pairs of poles desired, so as to primarily produce either circulating currents or currents in an external circuit by properly positioning the conductors upon the rotor. Also, the number of poles of the A and B windings can be varied in accordance with the speed range desired, and the A winding may be a single phase or split phase winding. In general, the greater the number of poles employed in the A and B windings, the slower the speed of the motor. It is also apparent that the A. C. windings may be positioned on the rotor instead of the stator.

In Fig. 17 is shown a development of the complete windings of a motor constructed in accordance with this invention. The A. C. winding A' is a three-phase distributed winding wound in the bottom of the slots of a 48 slot rotor and connected to produce a four-pole winding as indicated by the brackets 92. The D. C. stator winding B' is flat wound and positioned in the same slots adjacent the air gap, so as to produce six poles, as shown by the brackets 93. The rotor is shuttle wound with the D. C. winding C' which has the center coils omitted in order to provide a desired flux distribution and avoid over saturating the iron at the center of the coils. In this example C' is a four pole winding as shown by the brackets 94.

As in the previous example, the conductors of winding B' are positioned so that no resultant voltage is induced in this winding by the flux of winding A' when winding A' alone is energized. However, the conductors of winding C' are cut by the flux due to winding A' and the rotor will run at relatively high speed when the A winding only is energized. Winding B' acts as a load for the rotor currents under these conditions.

When the D. C. winding B' is energized as well as the A. C. winding A', a resultant voltage is induced therein causing a current to flow therein. Since in the example the coils of B winding are connected in series, this current is single phase and flows through the external circuit $B_1$, $B_2$, $C_1$, $C_2$ and the rotor windings C'. A single phase field is established by windings B' which reacts with the rotor windings to set up a six pole rotating field by single phase induction motor action. Energization of winding C' along with the energization of windings A' and B' increases the saturation of the iron, causes the A. C. windings A' to take more current, decreases the speed of the motor, and increases the available torque thereof as was the case of the motor shown in Fig. 3. The A. C. winding is normally energized so that the iron is subnormally saturated and this winding takes low current until D. C. energization is applied.

The D. C. stator winding may be considered to be a magnetic shield between the A. C. winding and the rotor winding which modifies the effect of the A. C. field upon the rotor winding. By using the tendency to produce strong torques and reduce the impedance of the A. C. stator winding and the rotor winding as energization of the D. C. stator winding is increased, it is possible to change the pole pitch of the A. C. stator winding as the impedance and saturation are changed. For example, if both stator windings have the same number of poles, two poles per phase are set up. This is caused by A. C. current induced in the D. C. stator winding from the A. C. stator winding.

As the D. C. stator winding is more strongly energized it lowers the impedance of the A. C. stator winding, permitting a larger current to flow through it. As a result the A. C. stator winding induces larger currents in the rotor winding and also in the D. C. stator winding, which tends to set up the second A. C. pole per phase. The second A. C. pole becomes increasingly stronger as the D. C. stator winding is more strongly energized, consequently permitting more A. C. to be induced in it from the A. C. winding. Thus, in effect, the number of poles of the A. C. winding is doubled.

By gradually increasing the energization of the D. C. stator winding, a corresponding gradual change from one to two poles per phase will follow, causing the rotor to attempt to lock in with the first and second poles. Since the A. C. winding is, at first, stronger, the rotor will be forced to follow its synchronous speed less the slip created by the increasing second pole. As the second pole strength is increased, this slip from the first pole strength is increased and a reduced speed of the motor will follow. Since the variation in the number of poles is smooth and gradual, the resultant change in motor speed will also be smooth and gradual.

A motor constructed in accordance with the invention herein disclosed has characteristics approaching those of a direct current shunt motor. The normal speed of the motor may be increased or decreased by varying the direct current excitation of the D. C. rotor and stator windings. This may be accomplished, as shown in Figs. 2 and 3, by varying the position of the contact arm 35 of the auto-transformer 36 so as to vary the direct current voltage impressed upon these windings. This direct current excitation may be produced by a battery, such as shown at 95 in Figure 12, and a variable resistance 96. Any other source of direct current power may be employed for the D. C. windings, or they may be energized from separate sources of direct current. Arrangements similar to Figs. 2 and 3 for supplying D. C. are, however, preferred since the direct current power is derived from the alternating current line with a simple means for controlling the voltage thereof, and the D. C. windings are connected together so that one D. C. winding functions as a load for the other.

As has been hereinbefore stated, disconnecting the alternating current source of power from the A winding of the motor of Figs. 2 and 3, while the motor is running and leaving the direct current source connected to the B and C windings produces a powerful braking effect which quickly brings the motor to a stop. The braking effect depends upon the degree of energization of these windings, the stronger the energization, the greater the braking effect. When the motor is running, the moving windings of the rotor cut the flux of the stationary field set up by the B winding, and voltages are induced in the conductors of the C winding which add to produce a single phase current therein. The winding B functions as a load for the C winding, and a torque is produced opposing rotation of the rotor. This torque is produced independently of the energization of the C winding, but such energization intensifies the braking effect. In the motor of Fig. 17, energization of the winding C' as well as winding B' is necessary in order that effective resultant voltages be induced in the winding C' when the A. C. energization is removed while the rotor is moving. This is for the same reason that winding B' must be energized before a resulting voltage is induced therein from winding A'. The effect in either modification is to produce an extremely smooth and rapid stopping of the motor.

The combined reactor and auto-transformer disclosed in Figs. 3, 4 and 5 aids in maintaining constant speed of the motor particularly at low speeds for a given setting of the contact arm 35 of the auto-transformer 36, although the motor, for most purposes, has satisfactory speed regulation. If the motor is running at a definite speed under a given load, the direct and alternating voltages are, of course, of the correct value to maintain this speed at that load. Should the motor load be decreased at this time, the rotor will tend to speed up, and the rotor frequency due to the rotor moving relative to the stationary field of the D. C. stator winding will change to a higher value. A portion of the rotor current flows through reactor coil 70. The reactance of this coil 70 increases with frequency, less current flows therein, and the saturation of the iron is decreased. The transformer effect of auto-transformer coil 36 is thereby increased to increase the voltage across the primary 32 of the plate transformer 31, which increases the voltage across the plates 29 of the rectifier to increase the direct current voltage. This increased direct current voltage more strongly energizes the B and C windings to decrease the motor speed to its normal value. The increased direct current voltage causes more current to flow through coil 41 to increase the saturation of the iron and to compensate for the effect of coil 70 in order to make the device stable. The opposite effect occurs if the load is increased so that the motor is prevented from slowing down.

Even with the circuit of Fig. 2, wherein the auto-transformer core 36 is on a different coil than the reactor coil 66 and saturation coil 41, the motor produces a high torque for low-speed operation and a decreasingly lesser torque for higher speed operation, in a manner similar to a direct current shunt motor, and also has speed regulation similar thereto. The range of speed variation is extremely broad, and the speed may be varied by a simple adjustment of the contact arm of the variable auto-transformer. The direct current power necessary is a very small portion of the total power produced by the motor as the motor is essentially an alternating current device.

In Fig. 18, a motor in accordance with this invention is shown connected as a torque relay. The alternating current winding $A_4$ is single phase and is positioned on the stator. In the example illustrated, this winding is arranged to produce four poles and is connected to an alternating current source by the conductors $A_1$ and $A_2$. The D. C. stator winding $B_4$ is also a four pole winding and has its poles positioned 90 electrical degrees from the poles of the A. C. winding. The D. C. stator winding is connected through an adjustable resistor 97 and conductors $B_1$ and $B_2$ to a D. C. source of power. This resistor is employed to adjust the average torque of the motor.

The rotor winding $C_4$, is a two pole winding arranged to have the relative strength of the poles varied. To accomplish this, one end of each of the coils thereof is connected through a common slip ring 98, collector 101, and conductors $C_1$, to the D. C. source. The other ends of the rotor coils are each connected through separate slip rings 99 and 100, collectors 102 and 103 and conductors $C_2$ and $C_3$, respectively, to opposite ends of a control resistor or potentiometer 104. An adjustable slider or contact arm 105 for the resistor 104 completes the circuit to the other side of the D. C. source.

Considering only the D. C. windings, the rotor will assume the position shown with the respective rotor poles intermediate the stator poles when the rotor poles are equally energized, that is, when the contact arm 105 of resistor 104 is in its center position. If, for example, the contact arm 105 is moved to the right in Fig. 18, the north pole of the rotor will be strengthened, that is to say, its field becomes more concentrated adjacent the center thereof, and the south pole weakened or made less concentrated such that the rotor will rotate to the right and assume a position with the north pole of the rotor nearer a south pole of the stator.

Considering also the A. C. stator winding, as this winding is single phase and the D. C. windings are positioned so that no resultant voltages are induced therein by the A. C. flux, no resultant torque is produced in the rotor when it is stationary under balanced conditions. As soon, however, as the contact arm 105 is moved, the balanced condition is destroyed, that is, the A. C. field is modified by the D. C. field so that resultant voltages are induced in the rotor windings by the A. C. field to produce torque in the same direction as that produced by the D. C. windings alone. As soon as the rotor starts to move, a rotating field is produced as in a single phase induction motor which increases the torque. When the above mentioned unbalanced condition is produced, resultant voltages are also induced in the coils of the D. C. stator winding B4 to cause A. C. current to flow therein and also the above mentioned rotating field induces voltages therein which cause A. C. currents to flow. This winding becomes a power winding as was the case in the similar windings of the polyphase motors of Figs. 1 to 17 to an extent depending upon its energization.

The D. C. stator winding in conjunction with the rotor winding also controls the saturation of the iron of the motor and therefore the impedance of the A. C. stator winding and the rotor winding to determine the magnitude of the currents flowing in these windings and therefore the torque of the motor, as was the case of the similar winding of the polyphase motors hereinbefore discussed. The resistor 97 controls the voltage applied to the D. C. stator winding B4 and therefore the effective torque of the motor. In a given installation the necessary voltage for the torque desired will be ordinarily predetermined or the windings designed in accordance with existing voltages to produce the required torque.

After movement of the contact arm 105 of the resistor 104 the rotor will approach a new balanced position and the torque produced by the D. C. windings alone and that resulting from an unbalanced condition will resist the torque due to single phase induction motor action to stop the motor at the new position. Thus the motor connected as a torque relay will follow the movement of a potentiometer, at high torque, maintains this torque during movement, and pulls into the new position with this high torque, and the magnitude of the torque is easily adjusted to fit the requirements of a particular installation.

In Fig. 19 is shown a modification of the device of Fig. 18 which differs therefrom in that the relative strengths of the poles of the D. C. stator winding B5 may also be varied simultaneously with those of the D. C. rotor winding C4. It has also been positioned asymmetrically with respect to the A. C. stator winding A5 in order to produce a stronger torque in one direction than in the other and the winding A5 has been divided into two circuits 106 and 107, as for a lower voltage, to illustrate that various connections are possible.

To vary the relative strengths of the poles of the winding B5 this winding has been divided into two portions 108 and 109, one end of each of which has been connected to the D. C. source by conductor B1. The other ends of the portions 108 and 109 are connected by conductors B2 and B3, respectively, to the opposite ends of a control resistor or potentiometer 110 having a contact arm 111 connected to the D. C. source to complete the D. C. circuit through the winding B5. The contact arms 105 and 111 are arranged for simultaneous operation as indicated by the member 112 and dotted lines 113 and the resistors are so connected that the north poles of the winding B5 are strengthened as the south poles of the winding C4 are strengthened and vice versa. By properly proportioning the resistors 104 and 110, the motor may be made to faithfully follow the movement of the contact arms 105 and 111 and, for example, move the same angle as the knob of a double rheostat. As stated before, this motor has stronger torque in one direction than in the other, but the torque may be made the same in both directions by symmetrically positioning the D. C. stator winding with respect to the A. C. stator winding as in Fig. 18. Thus the position of the D. C. stator winding controls the relative magnitude of the torque in the different directions of rotation and the degree of energization thereof controls the amount of torque.

Referring to Fig. 20, two motors having stator windings A4 and B4 identical with those of the motor of Fig. 18, but provided with phase wound rotor windings 114 connected together by conductors 115, 116 and 117 to form an electric gear; that is to say, to produce an operation similar to the well-known "Selsyn" connection, except that high torque both during movement and in pulling into and out of their corresponding positions is effected. The operation is very similar to that of the torque relay connection above discussed except that the "unbalanced condition" is produced by moving one of the rotors to a position to cause voltages to be induced therein and resultant currents in both rotors. In this modification also the D. C. stator winding B4 determines the effective torque.

While I have disclosed the preferred embodiments of my invention and have given a detailed theory of operation as an aid in understanding the nature thereof, it is understood that I am not to be limited to any specific theory of operation and that the details of my invention may be varied within the scope of the following claims.

Having thus described my invention, I claim:

1. In combination, a source of alternating current, a source of direct current, an adjustable speed alternating current motor of the induction motor type having a stationary member and a rotatable member, said motor having a distributed primary winding upon one of said members and energized by said source of alternating current to produce less than the normal magnetic flux of said motor for an adjusted speed less than the highest speed of said motor when said primary winding only is energized, a secondary winding upon the other of said members, and a distributed control winding upon said one of said members adjacent said primary winding and energized by said source of direct current to produce a magnetic flux which, in conjunction with the energization of said primary winding, produces the normal magnetic flux of said motor for said adjusted speed, said secondary winding being positioned within the combined magnetic flux produced by said primary and control windings and being connected to provide for the flow of power current therein due to voltages induced by said combined magnetic flux, said control winding being connected to said secondary winding through collector rings so that said control winding constitutes a load for said secondary winding.

2. In combination, a source of alternating current, a source of direct current, an adjustable speed alternating current motor of the induction motor type having a stationary member and a rotatable member, said motor having a distributed primary winding upon one of said members and energized by said source of alternating current to produce less than the normal magnetic flux of said motor for an adjustable speed less than the highest speed of said motor, a secondary winding upon the other of said members, and a distributed control winding upon said one of said members adjacent said primary winding and energized by said source of direct current to produce a magnetic flux stationary with respect to said one of said members which, in conjunction with the energization of said primary winding, produces the normal magnetic flux of said motor for said adjusted speed, said secondary winding being positioned within the combined magnetic flux produced by said primary and control windings and connected to provide for the flow of power current therein due to voltages induced by said combined magnetic flux said control winding being connected to said secondary winding through collector rings so that said control winding constitutes a load for said secondary winding.

3. In combination, a source of alternating current, a source of direct current, and an adjustable speed alternating current motor of the induction motor type having a stationary member and a rotatable member, a multipolar polyphase distributed primary winding upon one of said members and energized by said source of alternating current to produce a magnetic flux rotating with respect to said one of said members, a multipolar distributed control winding upon said one of said members adjacent said primary winding and energized from said source of direct current to produce a magnetic flux stationary with respect to said one of said members, the energization of said primary winding producing less than the normal magnetic flux of said motor for an adjusted speed less than the highest speed of said motor when said control winding is not energized and the energization of said control winding producing in conjunction with said primary winding the normal magnetic flux of said motor for said adjusted speed, the conductors of said control winding being positioned so that no substantial resultant voltages are induced therein when said primary winding only is energized, and a secondary winding upon the other of said members and being connected to provide for the flow of power current due to voltages induced by the combined flux of said primary and control winding.

4. In combination, a source of alternating current, a source of direct current and an adjustable speed alternating current motor of the induction motor type having a stationary member and a rotatable member, said motor having a distributed primary winding upon one of said members and energized by said source of alternating current to produce less than the normal flux of said motor for an adjusted speed less than the highest speed of said motor when said winding only is energized, said flux forming a magnetic field rotating with respect to said one of said members, a secondary winding upon the other of said members, and a distributed control winding upon one of said members adjacent said primary winding and having its conductors positioned so that no substantial resultant voltages are induced in said control winding when said primary winding only is energized, said control winding being energized from said source of direct current to produce a magnetic flux stationary with respect to the member upon which the control winding is positioned which in conjunction with the energization of said primary winding, produces the normal magnetic flux of said motor for said adjusted speed, said secondary winding being connected to provide for the flow of power current therein due to voltages induced by the combined flux of said primary and control windings.

5. In combination, a source of alternating current, a source of direct current and an adjustable speed alternating current motor of the induction motor type having a stationary member and a rotatable member, said motor having a primary winding upon one of said members and energized by said source of alternating current to produce less than the normal flux of said motor for an adjusted speed less than the highest speed of said motor when said winding only is energized, said flux forming a magnetic field rotating with respect to said one of said members, a secondary winding upon the other of said members, and a control winding upon one of said members having its conductors positioned so that no substantial resultant voltages are induced in said control winding when said primary winding only is energized, said control winding being energized from said source of direct current to produce a magnetic flux stationary with respect to the member upon which the control winding is positioned which, in conjunction with the energization of said primary winding, produces the normal magnetic flux of said motor for said adjusted speed, said control winding constituting a closed winding within said motor for currents due to voltages induced by the combined flux of said primary and secondary windings, said secondary winding being connected to provide for the flow of power current therein due to voltages induced by said combined flux.

6. In combination, a source of alternating current, a source of direct current and an alternating current motor of the induction motor type having a stationary member and a rotatable member, said motor having a distributed primary winding upon one of said members and energized by said source of alternating current to produce less than the normal flux of said motor when said winding only is energized, said flux forming a magnetic field rotating with respect to said one of said members, a secondary winding upon the other of said members, and a distributed control winding upon one of said members adjacent said primary winding and having its conductors positioned so that no substantial resultant voltages are induced in said control winding when said primary winding only is energized, said control winding being energized from said source of direct current to produce a magnetic flux stationary with respect to the member upon which the control winding is positioned which, in conjunction with the energization of said primary winding, produces the normal magnetic flux of said motor, said secondary winding being connected to provide for the flow of power current therein due to voltages induced by the combined flux of said primary and control windings, but having no substantial resultant voltages induced therein when said primary winding only is energized.

7. In combination, a source of alternating current, an external source of direct current, and a variable speed alternating current motor of the induction motor type having a stationary member and a rotatable member, said motor having a primary winding upon one of said members and energized by said source of alternating current to produce a magnetic field rotating with respect to said one of said members, a secondary winding upon the other of said members and energized by said source of direct current to produce a magnetic field stationary with respect to said other member, a control winding upon one of said members and energized from a source of direct current to produce a magnetic field stationary with respect to the member upon which it is positioned, said secondary winding being connected to provide for the flow of power current therein due to voltages induced by the combined fields of said primary and control windings, and means to vary the direct current energization of at least one of said control and secondary windings to vary the speed of said motor.

8. In combination, a source of alternating current, a source of direct current, and a variable speed alternating current motor of the induction motor type having a stationary member and a rotatable member, said motor having a primary winding upon one of said members and energized by said source of alternating current to produce a magnetic field rotating with respect to said one of said members, a secondary winding upon the other of said members and energized by said source of direct current to produce a magnetic field stationary with respect to said other member, a control winding upon one of said members and energized from a source of direct current to produce a magnetic field stationary with respect to the member upon which it is positioned, said control winding being connected so that no substantial resultant voltages are induced therein by said rotating field when said primary winding only is energized, said secondary winding being connected to provide for the flow of power current therein due to voltages induced by the combined fields of said primary and control windings, and means to vary the direct current energization of at least one of said control and secondary windings to vary the speed of said motor.

9. In combination, a source of alternating current, a source of direct current, and a variable speed alternating current motor of the induction motor type having a stationary member and a rotatable member, said motor having a primary winding upon one of said members and energized by said source of alternating current to produce a magnetic field rotating with respect to said one of said members, a secondary winding upon the other of said members and energized by said source of direct current to produce a magnetic field stationary with respect to said other member, a control winding upon one of said members and energized from a source of direct current to produce a magnetic field stationary with respect to the member upon which it is positioned, said secondary winding being connected to provide for the flow of power current therein due to voltages induced by the combined fields of said primary and control windings but having substantially no resultant voltages induced therein by said rotating field when said primary winding only is energized, and means to vary the direct current energization of at least one of said control and secondary windings to vary the speed of said motor.

10. In combination, a source of alternating current, a source of direct current, and a variable speed alternating current motor having a stationary member, a rotatable member, a primary winding upon one of said members and energized by said source of alternating current to produce a magnetic field rotating with respect to said one of said members, a control winding upon the same one of said members and energized by said source of direct current to produce a magnetic field stationary with respect to said member, a secondary winding upon the other of said members and energized from said source of direct current to produce a magnetic field stationary with respect to said other member, said secondary winding being connected to provide for the flow of power current due to voltages induced by said fields, and means for varying the degree of direct current energization of at least one of said control and secondary winding to vary the speed of said motor.

11. In combination, a source of alternating current, a source of direct current, and a variable speed alternating current motor having a stationary member, a rotatable member, a primary winding upon one of said members and energized by said source of alternating current to produce a magnetic field rotating with respect to said one of said members, a control winding upon the same one of said members and energized by said source of direct current to produce a magnetic field stationary with respect to said member, a secondary winding upon the other of said members and energized from said source of direct current to produce a magnetic field stationary with respect to said other member but having no substantial resultant voltages induced therein when said primary winding only is energized, and means for varying the degree of direct current energization of at least one of said control and secondary winding to vary the speed of said motor.

12. In combination, a source of alternating current, a source of direct current, and an alternating current motor having a stationary member, a rotatable member, a primary winding upon one of said members and energized by said source of alternating current to produce a magnetic field rotating with respect to said one of said members, a control winding upon the same one of said members and energized by said source of direct current to produce a magnetic field stationary with respect to said member, a secondary winding upon the other of said members and energized from said source of direct current to produce a magnetic field stationary with respect to said other member, said secondary winding being connected to provide for the flow of power current due to voltages induced by said fields, and means responsive to the frequency of the voltages induced in said secondary winding to vary the voltage of said source of direct current.

13. In combination, a source of alternating current, a source of direct current, and a variable speed alternating current motor of the induction motor type having a stationary member and a rotatable member, said motor having a primary winding upon one of said members and energized by said source of alternating current to produce a magnetic field rotating with respect to said one of said members, a secondary winding upon the other of said members and energized by said source of direct current to produce a magnetic field stationary with respect to said other member, a control winding upon one of said members and energized from a source of direct current to produce a magnetic field stationary with respect to the member upon which it is positioned, said control winding being connected so that no substantial resultant voltages are induced therein by said rotating field when said primary winding only is energized, said secondary winding being connected to provide for the flow of power current therein due to voltages induced by the combined fields of said primary and control windings, means to vary the direct current energization of at least one of said control and secondary windings to vary the speed of said motor, and means to disconnect said source of alternating current whereby the interaction of said control and secondary windings cause a braking action on said motor.

14. In combination, a source of alternating current, a source of direct current, and an adjustable speed alternating current motor having a stationary member and a rotating member, a primary winding upon one of said members and energized by said source of alternating current to produce a multipolar magnetic field rotating with respect to said one of said members and constituting when said primary winding only is energized less than the normal magnetic flux of said motor for an adjusted speed less than the highest speed of said motor, and a secondary winding upon the other of said members and energized from said source of direct current to produce a multipolar magnetic field stationary with respect to said other member and having a different number of poles than said rotating field positioned so that no substantial magnetic interlocking can occur between the poles of said fields, the energization of both said windings producing the normal magnetic flux of said motor for an adjusted speed, said secondary winding being connected to provide for the flow of power current therein due to voltages induced by the combined fields of said primary and secondary windings.

15. In combination, a source of alternating current, a source of direct current, and an adjustable speed alternating current motor having a stationary member and a rotating member, a primary winding upon one of said members and energized by said source of alternating current to produce a multipolar magnetic field rotating with respect to said one of said members and constituting when said primary winding only is energized less than the normal magnetic flux of said motor for an adjusted speed less than the highest speed of said motor, a secondary winding upon the other of said members and energized from said source of direct current to produce a multipolar magnetic field stationary with respect to said other member and having a different number of poles than said rotating field positioned so that no substantial magnetic interlocking can occur between the poles of said fields, the energization of both said windings producing the normal magnetic flux of said motor for an adjusted speed, said secondary winding being connected to provide for the flow of power current therein due to voltages induced by the combined fields of said primary and secondary windings, and means for varying the degree of energization of said secondary winding to adjust the speed of said motor.

16. In combination, a source of alternating current, a source of direct current, and an alternating current motor having a stationary member and a rotating member, a primary winding upon one of said members and energized by said source of alternating current to produce a multipolar magnetic field rotating with respect to said one of said members and constituting when said primary winding only is energized less than the normal magnetic flux of said motor, and a secondary winding upon the other of said members and energized from said source of direct current to produce a multipolar magnetic field stationary with respect to said other member and having a different number of poles than said rotating field positioned so that no substantial magnetic interlocking can occur between the poles of said fields, the energization of both said winding producing the normal magnetic flux of said motor, said secondary winding being connected to provide for the flow of power current therein due to voltages induced by the combined fields of said primary and secondary windings, the conductors of said secondary winding being positioned so that no substantial currents are caused to flow therein when said primary winding only is energized.

17. In combination, a source of alternating current, an external source of direct current, and an alternating current motor having a stationary member, a rotatable member, a primary winding upon one of said members and energized by said source of alternating current to produce less than the normal magnetic flux of said motor when said primary winding only is energized, a secondary winding upon the other of said members, and a control winding upon one of said members, said control and secondary windings being energized from said source of direct current to produce magnetic fields which, in conjunction with said primary winding, produce the normal magnetic flux of said motor, the field produced by said secondary winding being stationary with respect to said other member, said secondary winding being connected to provide for the flow of power current therein due to voltages induced by the combined magnetic fluxes of said windings.

18. In combination, a source of alternating current, a source of direct current, and an alternating current motor having a stationary member, a rotatable member, a primary winding upon one of said members and energized by said source of alternating current to produce a magnetic field rotating with respect to one of said members, a control winding upon one of said members and energized by said source of direct current to produce a magnetic field stationary with respect to the member upon which said control winding is positioned, a secondary winding upon the other of said members and energized from said source of direct current to produce a magnetic field stationary with respect to said other member, said secondary winding being connected to provide for the flow of power current due to voltages induced by said fields, and means responsive to voltages induced in said secondary winding to vary the voltage of said source of direct current.

19. In combination, a source of alternating current, a source of direct current, and an alternating current motor having a stationary member, a rotatable member, a primary winding upon one of said members and energized by said source of alternating current to produce a magnetic field rotating with respect to one of said members, a control winding upon one of said members and energized by said source of direct current to produce a magnetic field stationary with respect to the member upon which said control winding is positioned, a secondary winding upon the other of said members and energized from said source of direct current to produce a magnetic field stationary with respect to said other member, said secondary winding being connected to provide for the flow of power current due to voltages induced by said fields, said source of direct current including a rectifying device and a transformer supplying alternating current power to said rectifying device, said transformer including a core and a supplemental winding positioned upon said core and connected to said secondary winding so that the voltages induced in said secondary winding determine the current in said supplemental winding and control the reactance of said core and the voltage of said direct current source.

20. In combination, a source of alternating current, a source of direct current, and an alternating current motor having a stationary member, a rotatable member, a primary winding upon one of said members and energized by said source of alternating current to produce a magnetic field rotating with respect to one of said members, a control winding upon one of said members and energized by said source of direct current to produce a magnetic field stationary with respect to the member upon which said control winding is positioned, a secondary winding upon the other of said members and energized from said source of direct current to produce a magnetic field stationary with respect to said other member, said secondary winding being connected to provide for the flow of power current due to voltages induced by said fields, said source of direct current including a rectifying device and a transformer supplying alternating current power to said rectifying device, said transformer including a core and a supplemental winding positioned upon said core and connected to said secondary winding so that the voltages induced in said secondary winding determine the current in said supplemental winding and control the reactance of said core and the voltage of said direct current source, said transformer also including another winding upon said core and connected across said direct current source to further control the reactance of said core.

21. In combination, a source of alternating current, a source of direct current, and an alternating current motor having a stationary member, a rotatable member, a distributed primary winding upon one of said members and energized by said source of alternating current to produce a magnetic field rotating with respect to said one of said members, a distributed control winding upon the same one of said members and energized by said source of direct current to produce a magnetic field stationary with respect to said member, and a secondary winding upon the other of said members and energized from said source of direct current to produce a magnetic field stationary with respect to said other member, said secondary winding being connected to provide for the flow of power current due to voltages induced by said fields and being connected to said control winding through collector rings so that said control winding constitutes a load for said secondary winding.

22. In combination, a source of alternating current, a source of direct current, and an alternating current motor having a stationary member, a rotatable member, a distributed primary winding upon one of said members and energized by said source of alternating current to produce a magnetic field rotating with respect to said one of said members, a distributed control winding upon the same one of said members and energized by said source of direct current to produce a magnetic field stationary with respect to said member, and a secondary winding upon the other of said members and energized from said source of direct current to produce a magnetic field stationary with respect to said other member but having no substantial resultant voltages induced therein when said primary winding only is energized, said secondary winding being connected to said control winding through collector rings so that said control winding constitutes a load for said secondary winding.

23. In combination, a source of alternating current, a source of direct current, a variable speed induction motor having relatively rotating members, a distributed primary winding and a distributed control winding upon one of said members, said primary winding being connected to said alternating current source to produce a rotating field with respect to said one of said members, said control winding being connected to said direct current source to produce a stationary field with respect to said one of said members, a secondary winding upon said other member, said secondary winding being connected to said control winding through collector rings so that said control winding constitutes a load for said secondary winding.

CHARLES P. SWEENY.